Oct. 4, 1927.  W. W. CARSON, JR  1,644,325
THERMOSTATICALLY CONTROLLED VALVE MECHANISM
Filed Oct. 30, 1926    2 Sheets-Sheet 1

Inventor
William W. Carson Jr.,
By Maury, Cameron, Lewis & Kerkam
Attorneys

Oct. 4, 1927.   W. W. CARSON, JR   1,644,325
THERMOSTATICALLY CONTROLLED VALVE MECHANISM
Filed Oct. 30, 1926   2 Sheets-Sheet 2

Inventor
William W. Carson, Jr.,
By Mauro, Cameron, Lewis & Massey
Attorneys

Patented Oct. 4, 1927.

1,644,325

UNITED STATES PATENT OFFICE.

WILLIAM W. CARSON, JR., OF KNOXVILLE, TENNESSEE, ASSIGNOR TO THE FULTON SYLPHON COMPANY, OF KNOXVILLE, TENNESSEE, A CORPORATION OF DELAWARE.

THERMOSTATICALLY-CONTROLLED VALVE MECHANISM.

Application filed October 30, 1926. Serial No. 145,346.

This invention relates to thermostatically operated valve mechanism, and particularly to devices of this character for controlling the circulation of a cooling medium through the cooling systems of internal combustion engines. The invention is capable of embodiment both in thermostatically operated valve mechanism of the choker type wherein the opening and closing of the valve determines the quantity of cooling medium circulating through the system and in thermostatically operated valve mechanism of the by-pass type wherein the opening and closing of the valve determines the path of said cooling medium.

It is an object of this invention to provide a thermostatically operated valve mechanism of simplified construction whereby the same may be readily and economically manufactured without skilled labor and which is at the same time light and strong and durable and accurate and efficient in operation.

Another object of this invention is to provide a device of the character described with improved means for associating the thermostat and valve mechanism by use of a combined support and cage for a thermostat, and which may be inexpensively manufactured and assembled.

Other objects of the invention will appear as the description of the invention proceeds.

The invention is capable of receiving a variety of mechanical expressions, one of which is shown on the accompanying drawings, but it is to be expressly understood that the drawings are for purposes of illustration only and are not to be construed as a definition of the limits of the invention, reference being had to the appended claims for that purpose.

Referring in detail to the drawings wherein the same reference characters are employed to designate corresponding parts in the several figures Fig. 1 is an enlarged axial section of a thermostatically operated valve mechanism embodying the present invention.

Figure 1:
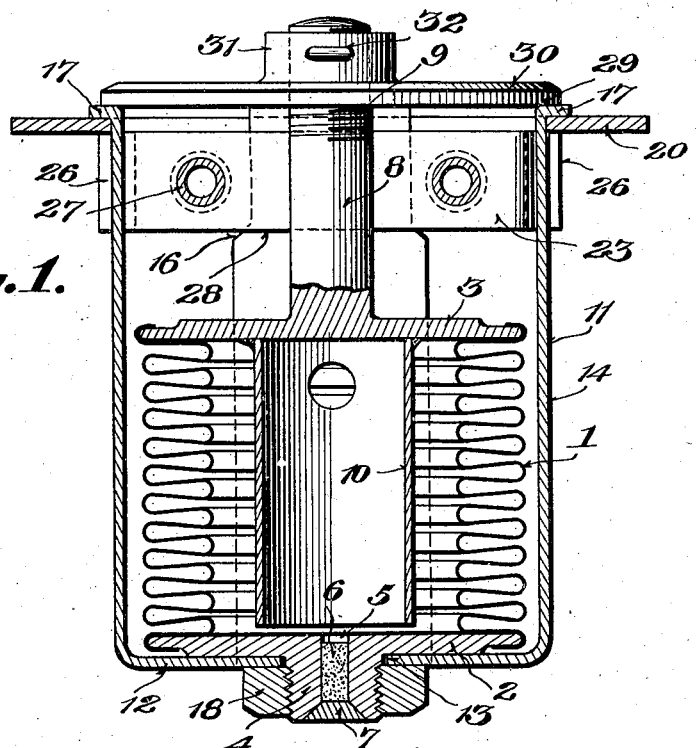

In the form shown in Fig. 1, 1 is a thermostat of any suitable construction and possessed of any suitable characteristics, it being shown as composed of a deeply corrugated, highly flexible, expansible and collapsible tubular metal wall, preferably of resilient metal, connected in any suitable way at its opposite ends, as by soldering or brazing, to a stationary end wall 2 and a movable end wall 3. The stationary end wall 2 is provided with an exteriorly threaded boss 4 which may also contain the usual filling opening 5, shown as sealed by a stopper 6 and solder 7. The movable end wall is provided in any suitable way, integral therewith or connected thereto, with a valve stem 8, shown as threaded at its exterior end 9. Interiorly of the thermostat, said movable end wall 3 is provided with a tubular stop 10, integral therewith or suitably attached thereto, which by engagement with the stationary end wall 2 is designed to limit the contraction of the thermostat.

Figure 5:
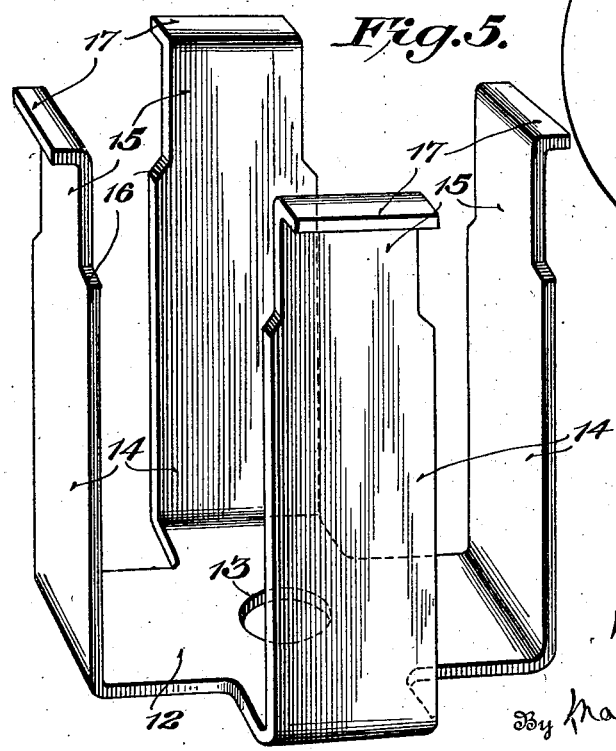
Fig. 5 is a perspective view of the combined cage and support.

In conformity with the present invention the thermostat 1 is mounted in position by means of a combined cage and support 11 which is preferably formed of sheet metal and which may be readily bent up from a blank of cruciform configuration. As shown in Fig. 5, said combined cage and support has a base portion 12 in which is located an aperture 13 designed to receive the threaded boss 4 on the stationary end wall 2 of the thermostat. Projecting at substantially right angles to the base 12 are a plurality of arms 14 which are reduced in width at their outer ends as shown at 15, said reduced portions 15 being connected to the main portions of said arms by inclined or beveled surfaces 16. At their outer extremities, each of said arms is provided with a right angular bend or flange 17. While it is preferred to bend up said combined cage and support from a single blank as illustrated in Fig. 5, the broader aspects of the invention are not restricted thereto, as the combined cage and support can be formed of a plurality of strips bent to a suitable shape and crossing each other at their base portions. Moreover, while the combined cage and support has been shown as provided with four arms, the invention is not limited thereto, as a smaller or larger number of arms may be used without departing from the spirit of the invention.

The combined cage and support is assembled with the thermostat by engaging the base portion 12 with the stationary end wall 2 of the thermostat, with the threaded boss 4 projecting through the aperture 13, and the parts are then secured in this position by a nut 18 threaded onto the boss 4 until the combined cage and support is fixedly clamped to the stationary end wall of the thermostat.

Figure 3:
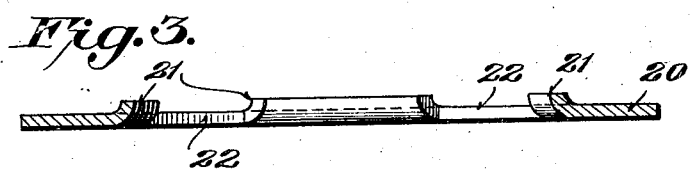
Fig. 3 is a section of the valve seat ring.
Figure 6:
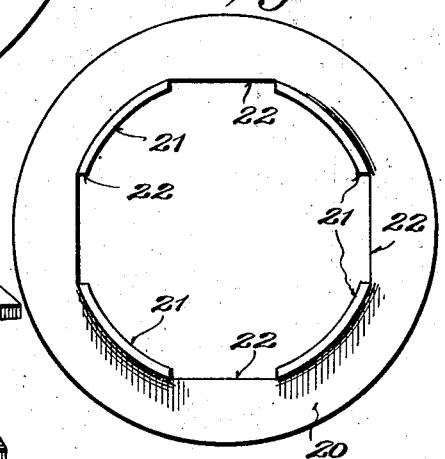
Fig. 6 is a plan view on a smaller scale of the valve seat ring.

The combined cage and support is then assembled with a valve seat ring of novel construction, shown more particularly in Figs. 3 and 6. As here shown, said valve seat ring takes the form of an annulus 20 which may be conveniently formed from sheet metal, said annulus at its inner periphery being provided with a plurality of segments 21 separated by spaces 22 which are in effect notches between said segments. The notches 22 correspond in number and width to the flanged ends 15 of the arms of the combined cage and support for the thermostat, and the segments 21 are bent at substantially a right angle to the plane of the ring, said segments projecting axially of the aperture in the valve seat ring a distance substantially equal to the axial thickness of the flanges 17. The combined cage and support is assembled with the valve seat ring by collapsing the arms 14 inwardly so as to permit the flanged ends of the arms 14 to be introduced through the opening in the valve seat ring, and said arms 14 are then expanded to engage the upper reduced ends 15 thereof in the notches 22 with the flanges 17 engaging the ring 20 between the axially projecting segmental portions 21.

Figure 4:
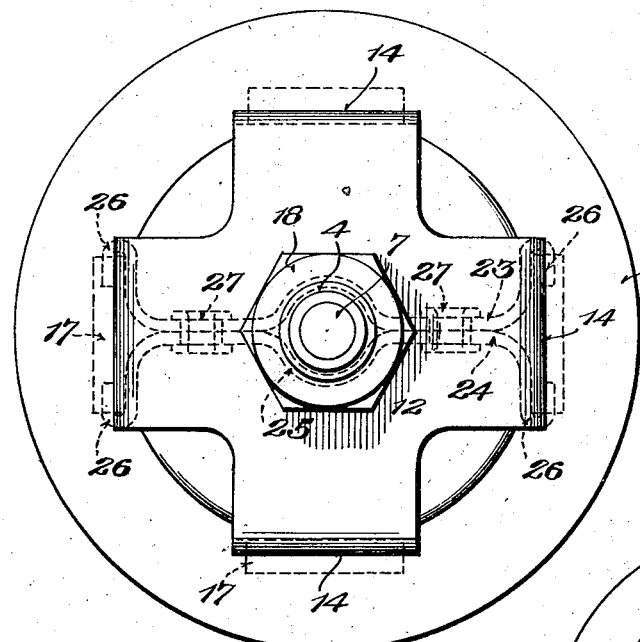
Fig. 4 is a bottom plan view of the embodiment of Fig. 1.

The combined cage and support may be secured within the valve seat ring in this position in any suitable way, preferably by means of a clamping device which acts both as a brace between a pair of opposed arms 14 and a clamp for securing the valve seat ring against the underfaces of the flanges 17, and which may also act as a guide for the valve stem 8 and also, if desired, as a stop to limit the expansive movement of the thermostat. As shown in dotted lines in Fig. 4, such a transverse clamping member may be composed of a pair of strips 23 and 24, preferably formed of sheet metal, each of said metal strips being provided, intermediate its length, with a generally semicircular bend 25 and at its extremities, with hook-shaped bends 26, or they may be given any other suitable shape so that when assembled as shown in Fig. 4, they embrace the valve stem, and may be secured in this position in any suitable way, as by rivets or screws 27. When so assembled, the opposed curved portions 25 are of suitable size to constitute a tubular guide for the valve stem 8. While it is preferred to bend both of said strips as shown, so that they are formed from duplicate blanks, said strips may be so designed that only one of them is bent, or their bends may be unequal, to embrace the valve stem. The length of the sections 23 and 24 and the size of their hook-shaped ends are such that when the sections are united, as shown in Fig. 4, they maintain a pair of opposed arms 14 interlocked in the notches 22, the transverse member 23, 24 thereby acting as a brace to prevent the inward collapse of said arms or the disengagement thereof from the notches in the valve seat ring. The hook-shaped extremities are also of such size as to closely embrace the reduced ends 15 of the arms 14, and the width of said ends in an axial direction is such, as compared with the distance between the underside of the valve seat ring 20, when in position against the underfaces of the flanges 17, and the inclined or beveled faces 16, that when the sections are assembled, as shown in Fig. 4, said beveled or inclined surfaces 16 cam the transverse member 23, 24 axially outward and force the valve seat ring 20 snugly against the underfaces of said flanges 17, clamping said valve seat ring between said flanges and the outwardly projecting extremities of the hook-shaped ends of said transverse member 23, 24. While only one transverse member has been shown between a pair of opposed arms 14, the invention is not restricted thereto, as by properly designing the sizes, particularly at their intermediate portions, of the sections from which the transverse members are formed, transverse members of the general character illustrated in Fig. 4 may be employed between each opposed pair of arms 14.

The transverse member 23, 24 may be and preferably is so designed that its inner edge 28 is properly positioned for engagement with the movable end wall 3, or a projection thereon or on the valve stem 8, to limit the expansive movement of the thermostat.

Figure 2:
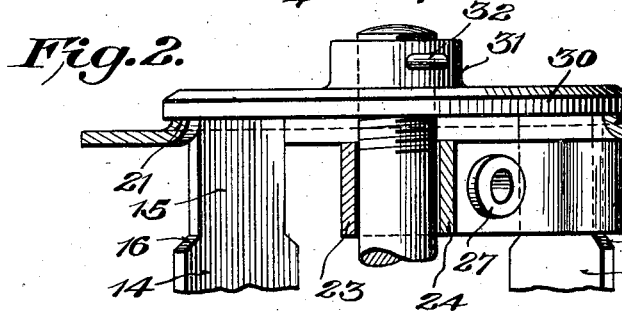
Fig. 2 is a fragmentary axial section of the embodiment of Fig. 1 taken in a plane at an angle to the section plan of Fig. 1.

When the combined cage and support 11 has been assembled with the valve seat ring in the manner heretofore described, the outer surfaces of the flanges 17 and the segmental projections 21 are grounded or otherwise suitably finished so as to provide an annular surface 29 which constitutes a valve seat. Mounted on the valve stem 8 is a valve member of any suitable construction for coaction with said valve seat 29. Said valve member may be formed of sheet metal and provided with a central hub of any suitable character, or the valve member may be otherwise constructed. In Figs. 1 and 2 valve member 30 is shown as provided with a central interiorly threaded hub 31 and locked to the valve stem by a cotter pin 32 positioned in a hole drilled through said hub and stem.

In assembling the parts a thermostat of any suitable character is first provided and a combined cage and support of the character shown in Fig. 5 is assembled with the thermostat by locking the base portion thereof to the stationary end wall of the thermostat by means of the nut 18. A valve seat ring 20 of the character shown in Fig. 6 having been provided, the arms 14 of the combined support and cage are introduced through the central aperture of said ring, and the outer extremities 15 of said arms engaged in the notches 22 with the flanges 17 engaging the outer face of said valve seat ring. The parts are then clamped in this position by uniting the pair of sections 23, 24 into a transverse member of the character shown in Fig. 4, the inclined or beveled surfaces 16 forcing the hook-like extremities 26 of said transverse member axially outward into engagement with the valve seat ring 20 and clamping the same between the exteriorly projecting extremities 26 of said member and the flanges 17. The pair of opposed arms 14 engaged by said transverse member are also locked against inward movement to disengage said arms from the notches 22 and, if desired, the flanges 17 may be soldered to the ring 20 to further insure their permanent attachment. The valve seat 29 being formed by grinding or otherwise finishing the outer faces of the flanges 17 and the segmental projections 21, the valve disk 30 is threaded onto the valve stem 8 until it engages valve seat 29, and preferably threaded a little further so as to withdraw the tubular stop 10, when used, from engagement with the end wall 2 of the thermostat, and said valve member is thereupon locked to the valve stem 8, as by the cotter pin 32.

The thermostat is thus rigidly supported by the combined cage and support 11, and its stationary end wall 2 is locked to the valve seat ring against both axial and radial displacement. The transverse member 23, 24 also acts as a guide for the valve stem 8, and, if desired, may act as a stop to limit the expansive movement of the thermostat. The contractive movement of the thermostat is limited by contact of the valve member 30 with its seat when in position, or by the engagement of the tubular stop 10 with the stationary end wall 2 when the valve member is not in position, although this latter function may be performed by a suitable stop on the valve stem engaging the transverse member 23, 24, if desired.

As before pointed out, the thermostat may be of any suitable character and possessed of any suitable physical characteristic. Preferably, it is charged with a suitable thermosensitive fluid at a pressure below atmospheric, at normal temperature, so that at all temperatures below that at which the thermostat is designed to operate, the interior pressure will be less than the exterior pressure, whereby the exterior pressure tends to collaps the thermostat. In the event of a leak of the thermostat and the equalization of the internal and external pressures, the thermostat will therefore tend to expand and move the valve to open position. It is to be expressly understood, however, that the invention is not limited to the use of a thermostat of any particular construction or characteristics.

It will therefore be perceived that a simple thermostatically-operated valve unit has been provided which is composed of a few readily manufactured parts, many of which may be blanked out of and bent up from sheet metal, and which may be inexpensively produced, assembled without the use of skilled labor and which, when assembled, form a light but strong and rigid support for the thermostat, fixedly retaining its stationary end wall in position and guiding and, if desired, limiting the movements of its movable end wall. While it is preferred to make the parts out of sheet metal, the invention, in its broader aspects, is not limited to the use of this material.

While the embodiment of the invention shown on the drawings has been described with considerable particularity, it is to be expressly understood that the invention is not restricted thereto, as the same is capable of receiving a variety of mechanical expressions, some of which will now readily suggest themselves to those skilled in the art, while changes may be made in the details of construction, arrangement and proportion of parts without departing from the spirit of this invention. Reference is therefore to be had to the claims hereto appended for a definition of said invention.

What is claimed is:

1. In a device of the character described, in combination with a thermostat and a valve member operatively connected thereto, a valve seat ring provided with projections, and a support for said thermostat engaging said projections and cooperating therewith to provide a valve seat for said valve member.

2. In a device of the character described, in combination with a thermostat and a valve member operatively connected thereto, a valve seat ring provided with axially extending projections and a support for said thermostat interengaging said projections and cooperating therewith to provide a seat for said valve member.

3. In a device of the character described, in combination with a thermostat and a valve member operatively connected thereto, a valve seat ring provided with axially extending projections, and a support for said thermostat provided with radially extending projections interengaging with said axially extending projections and cooperating therewith to form a seat for said valve member.

4. In a device of the character described, in combination with a thermostat and a valve member operatively connected thereto, a valve seat ring provided with axially extending projections spaced to provide slots therebetween, and a support for said thermostat provided with arms interengaging in said slots and forming with said projections a seat for said valve member.

5. In a device of the character described, in combination with a thermostat and a valve stem operatively connected thereto, a valve seat ring and a support for the thermostat provided with interlocking projections which cooperate to provide a seat for said valve member, and means for locking said support to said ring.

6. In a device of the character described, in combination with a thermostat and a valve member operatively connected thereto, a valve seat ring provided with projections, a support for said thermostat provided with arms interengaged with said projections and cooperating therewith to provide a seat for said valve member, and means for locking said arms to said valve seat ring including a transverse member composed of sections united to embrace opposed arms of said support.

7. In a device of the character described, in combination with a thermostat and a valve member operatively connected thereto, a valve seat ring provided with axially extending projections, a support for said thermostat provided with arms interengaged with said projections and cooperating therewith to provide a seat for said valve member, and a transverse member for securing said arms to said ring, said member including sections provided with hook-shaped extremities and united with said hook-shaped extremities embracing opposed arms of said support.

8. In a device of the character described, in combination with a thermostat and a valve member operatively connected thereto, a valve seat ring provided with projections, a support for said thermostat provided with arms which interlock with said projections and cooperate therewith to provide a seat for said valve member, and a member for securing said arms to said ring, said member embracing said valve stem and acting as a guide therefor.

9. In a device of the character described, in combination with a thermostat and a valve member operatively connected thereto, a valve seat ring provided with projections, a support for said thermostat provided with arms which interlock with said projections and cooperate therewith to provide a seat for said valve member, and a member for securing said arms to said ring, said member acting as a stop to limit the movement of the thermostat.

10. In a device of the character described, in combination with a thermostat and a valve member operatively connected thereto, a valve seat ring provided with axially extending projections, a support for said thermostat provided with arms which interlock with said projections and form a valve seat, and a transverse member for securing said arms to said ring, said arms having radially projecting flanges which engage said ring on one side and said transverse member having portions which engage said ring on its opposite side.

11. In a device of the character described, in combination with a thermostat and a valve member operatively connected thereto, a valve seat ring provided with axially extending projections, a support for said thermostat provided with arms having flanges which interlock with said projections, said flanges and projections constituting a valve seat for said valve member, and means for locking said arms in engagement with said ring.

12. In a device of the character described, in combination with a thermostat and a valve member operatively connected thereto, a valve seat ring provided with axially extending projections, a support for said thermostat provided with arms having flanged extremities interengaged with said projections, the extremities of said arms and said projections constituting a valve seat for said valve member, and a transverse member for securing said arms to said ring, said member including sections united to embrace opposed arms of said support.

13. In a device of the character described, in combination with a thermostat and a valve member operatively connected thereto, a valve seat ring provided with notches at its inner periphery with raised portions therebetween, a support for said thermostat provided with arms engaged in said notches, said arms constituting with said raised portions a valve seat for said valve member, and means for locking said arms in engagement with said ring including a transverse member composed of sections united to said arms.

14. In a device of the character described, in combination with a thermostat and a valve member operatively connected thereto, a valve seat ring provided with notches at its inner periphery with raised portions therebetween, a support for said thermostat provided with arms engaged in said notches, said arms being provided with radially projecting flanges which engage the outer faces of said valve seat ring and fill the spaces between said raised portions whereby the outer faces of said flanges and said raised portions constitute a valve seat for said valve member, and means for locking said arms to said ring including a transverse member composed of sections united to said arms.

15. In a device of the character described, in combination with a thermostat and a valve member operatively connected thereto, a valve seat ring provided with notches at its inner periphery with raised portions therebetween, a support for the thermostat provided with arms which engage in said notches, said arms being provided with radially projecting flanges which engage the outer faces of said valve seat ring and fill the spaces between said raised portions whereby the outer faces of said flanges and said raised portions constitute a valve seat for said valve member, and a transverse member for clamping said ring against said flanges and including a plurality of sections having hook-shaped extremities united about opposed arms and cooperating to provide a valve stem guide.

In testimony whereof I have signed this specification.

WILLIAM W. CARSON, Jr.